Patented May 5, 1936

2,039,302

UNITED STATES PATENT OFFICE 2,039,302

ARTIFICIAL SILK AND OTHER ARTIFICIAL PRODUCTS

Henry Dreyfus, London, England

No Drawing. Application August 7, 1930, Serial No. 473,781. In Great Britain October 10, 1929

16 Claims. (Cl. 106—40)

This invention relates to the production or treatment of artificial filaments, threads, yarns, ribbons, fabrics, films or other materials, and is more particularly concerned with new or improved processes for the production of filaments, threads, fabrics, or other materials having a reduced, subdued or modified lustre.

According to the present invention, artificial products having a subdued, reduced or modified lustre are produced by incorporating therein organic substances having a melting point of at least 207° C. in a quantity greater than is soluble in the base, for example cellulose acetate, of which the filaments, ribbons, films, or other materials consist or which they contain. The organic substances are preferably insoluble or substantially insoluble in or incompatible with the base, for example cellulose acetate, and, moreover, should be insoluble in water and in dilute acids or alkalies or other reagents with which the materials are liable to be treated in commercial practice. Furthermore considerable advantages result from the use of substances insoluble in the common organic solvents.

I have found that the best results are obtainable by means of organic substances which are of high or very high melting point, for example above about 240°–260° C., or even above 290–300° C. Substances which I have found particularly suitable are the acidyl and particularly the diacidyl derivatives of benzidine and of like diamino diphenyl bases, e. g. diacetyl benzidine, dibenzoyl benzidine, and diacetyl tolidine; symmetrical-α-dinaphthyl urea, the condensation products of urea or thiourea and diphenyl bases, for example thiocarbo benzidine

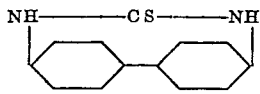

carbo benzidine

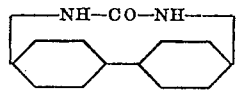

4.4'-diureido diphenyl

4.4'-dithioureido diphenyl

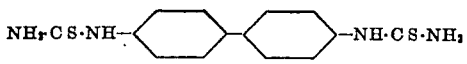

and their derivatives, for example diphenyl diureido diphenyl

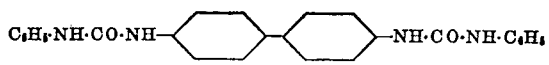

β-tetranaphthyl urea, β-dinaphthyl-oxamide, succinic α-naphthalide, para-nitrophenylphthalimide, anthraquinone, 2.6-dichloranthraquinone or other derivatives of anthraquinone having a high melting point and acenaphenequinone. Substances of lower melting point may be used, but their use is less advantageous. Such substances are, for example, anthracene, carbazole, symmetrical-α-dinaphthyl thiourea and diphenyl oxamide. All these substances are substantially insoluble in water and aqueous liquids and in organic solvents, and for this reason their incorporation in artificial materials yields products having a subdued, reduced or modified lustre of great permanence.

The organic substances may be incorporated in the materials by any convenient method. I prefer to incorporate them in the spinning solutions used for the manufacture of the artificial filaments, threads, yarns, ribbons, films, etc. and this method of incorporation forms an important feature of the present invention. The organic substances are particularly advantageous for incorporation in spinning solutions, e. g. acetone solutions of cellulose acetate, since it is found that, even though they are insoluble therein, stable suspensions or dispersions are readily obtainable from which the dispersed or suspended substances do not readily settle. In fact this invention presents very great advantages in the case of spinning solutions of cellulose derivatives in organic solvents, for example solutions of cellulose acetate, cellulose formate, cellulose propionate, cellulose butyrate or other cellulose esters, including cellulose nitrate, or of methyl cellulose, ethyl cellulose, or benzyl cellulose or other cellulose ethers.

As stated above, the organic substances are preferably insoluble in water and in organic solvents, and they may be incorporated in the spinning solution in a state of dispersion or fine sub-division. Preferably, the degree of sub-division is such as to enable the spinning solutions to be spun without obstructions being caused in the spinning pumps, spinning dies, or other parts of the apparatus. The substances may be sufficiently finely divided or dispersed to enable them to pass through the filters, so that they may be incorporated in the spinning solutions before their filtration.

To enable the organic substances to pass the spinning nozzles and/or filters without causing obstruction it is usually sufficient to attain an average particle size of about .003 millimetre, though higher particle sizes, such as up to .006 millimetre, may be used without seriously impeding the spinning operation. In order to obtain the maximum modification of lustre it is preferable to reduce the particle size to below .003 millimetre, for example down to .0001–.0005 millimetre. This may be effected by grinding either dry or in the presence of liquids, for example water or the solvent to be used for making up the spinning solution, e. g. acetone. Or again the substance may be ground in the presence of the spinning solution itself or a portion thereof, e. g. in presence of an acetone solution of cellulose acetate. Many of the products mentioned above are soluble in strong sulphuric acid and may be precipitated from solutions therein, e. g. by drowning in water, in a very finely divided form indeed. The finely divided substance if not already incorporated in the solvent for the spinning solution or in the spinning solution itself may be worked therewith in any desired manner. The state of dispersion may be improved by carrying out either the initial grinding if used or the working with the solvent or spinning solution in presence of dispersators and/or protective colloids, for example Turkey red oil (preferably applied in relatively small proportions) and/or in the presence of oils, such as oleic acid, linseed oil, olive oil or the like. Aqueous or oily pastes of the organic substance may be worked with the solvent or with the spinning solution as before.

Preferably the organic substance has as uniform a particle size as possible, and to effect this a suitable grading of the particles prior to incorporation in the solvent or in the spinning solution may be effected, for example by means of a cyclone separator or other means whereby the finer particles are carried off by a current of air or other gas with subsequent fractional settling from the gas current. If the organic substance employed be insoluble in the spinning solution but soluble in another solvent it may be dissolved in such other solvent and the solution added to the solvent used for making up the spining solution or better still to the spinning solution itself. In such a case if precipitation takes place in the solvent or in the spinning solution the precipitated particles are usually finely divided.

In some cases, the organic substance may be obtained in a very fine state of sub-division by actually forming it in the spinning solution itself or otherwise in the presence of the cellulose derivative or other base of the spinning solution or by forming it in the solvent used for making up the spinning solution. For example, leuco anthraquinone or the leuco compounds of anthraquinone derivatives may be dissolved in a suitable organic solvent, which may be the solvent to be used in the spinning solution, and the leuco compound oxidized to the anthraquinone or derivative thereof so as to obtain a fine suspension or dispersion of the anthraquinone or derivative thereof in the solvent. Such a formation of the anthraquinone or anthraquinone derivative or other organic substance may furthermore take place in the presence of the cellulose acetate or other base of the spinning solution; for example the leuco compound of anthraquinone or a derivative thereof may be dissolved in the spinning solution and then oxidized. Again, the organic substance may be formed in the presence of the cellulose acetate or other base apart from the solvent employed in the spinning solution. For example it may be formed in an acetylation or esterification mixture before or after ripening but before the precipitation of the cellulose acetate or other ester.

As indicated above, the organic substance or substances employed are preferably insoluble or substantially insoluble in the cellulose acetate or other base used for forming the materials, and in such cases the quantity of organic substance incorporated may be of the order of ½–1 or 2% of the organic substance relative to the cellulose derivative or other base. The invention is, however, not limited to such quantities, since lower or higher quantities, for example 5–10% or more, may be employed. In the case of using substances which are somewhat soluble in the cellulose derivative or other base, the higher proportions may be necessary to produce the required effect, and the invention contemplates the employment of such organic substances in a quantity greater than that which will dissolve in the cellulose derivative or other base.

The substances employed are preferably white or substantially white, so that any desired colouration may be imparted to the materials in the usual manner. In certain cases, however, improved results may be obtained by incorporating a small proportion of a black or other dark-coloured substance, which may be either organic or inorganic, in addition to a white organic substance. For example, a black or dark organic colouring matter may be added, e. g., in a proportion of about 1–2%, to a white or substantially white organic substance and the whole incorporated in the materials in the desired proportion as described above.

The spinning solutions in which have been incorporated organic substances may be spun by dry or wet spinning methods. Dry spinning may take place in the normal manner, but in the case of wet spinning a coagulating bath should be used in which the organic substance or substances are substantially insoluble. If the preferred substances referred to above are employed, namely substances which are insoluble in water, in dilute acids or alkalies and in the common organic solvents, this selection of the coagulating bath will present no difficulties. In fact all the ordinary coagulating baths may be used.

Novel effects may be produced by twisting, weaving, knitting or otherwise associating the filaments of modified lustre with the normal lustrous filaments of cellulose acetate or of other artificial silks or fibres or by associating the new filaments with other fibres, such as cotton, wool and the like. In addition novel yarns or threads containing both the filaments or the like of subdued or modified lustre and filaments or the like of normal lustre may be produced by twisting together dull filaments from one spinning nozzle with bright or normal lustrous filaments from another spinning nozzle, the twisting being effected continuously with production. Or again part of the jet orifices of a single nozzle may be fed with a spinning solution containing an insoluble substance and the remaining part of the jet orifices fed with normal spinning solution. The dull and bright filaments extruded from the single spinning jet may then be associated and/or twisted as desired. Fabrics prepared from such "mixed" yarns or threads exhibit important novel effects. Filaments of subdued lustre obtained according to this invention may be united to each other and/or to filaments of normal lustre so as to obtain special monofil threads, for example, by associating several filaments while the latter still retain some of the solvent and are tacky or sticky, or by applying to individual filaments a substance which will exert a solvent or softening action thereon and subsequently associating the thus treated filaments while they are in a tacky condition.

If desired the reduced, subdued, or modified lustre effects of the present invention may be enhanced by applying the present processes in conjunction with the processes described in U. S. Patents Nos. 1,957,508 and 1,938,646, or other processes designed to modify the lustre of the artificial materials.

As already indicated the invention is more particularly applicable to the production of filaments, yarns, ribbons or other products from solutions containing cellulose acetate or other cellulose esters and is especially useful for spinning such solutions by the dry spinning method. The invention may, however, also be applied to the production of filaments or other products of reduced, subdued or modified lustre from solutions of other bases, for example viscose or other base used for the manufacture of filaments or other products of the cellulosic type. The term "organic substances" as used in the specification and hereinafter in the claims is to be construed as embracing only those substances which are wholly organic in character.

What I claim and desire to secure by Letters Patent is:—

1. Artificial filaments, threads, yarns, ribbons, films, fabrics and the like having a reduced, subdued or modified lustre which contain a finely divided substantially white organic compound which has a melting point of at least about 200° C. and is an acidyl derivative of a diamino diphenyl base.

2. Artificial spun products of organic derivatives of cellulose having a modified lustre due to the presence therein of fine particles of a substantially white crystalline organic substance having a melting point of at least 207° C. and which is substantially insoluble in the base of said products and in aqueous liquids.

3. Artificial spun products of cellulose acetate having a modified lustre due to the presence therein of fine particles of a crystalline substance having a melting point of at least 240° C. and being substantially insoluble in the base of said products, in aqueous liquids and in common organic solvents.

4. Artificial spun products of organic derivatives of cellulose having a modified lustre due to the presence therein of fine particles of a substantially white crystalline organic compound which contains the diphenyl group, is substantially insoluble in the organic derivative of cellulose and in aqueous liquids and which has a melting point of at least 207° C.

5. Artificial filaments, threads, yarns, ribbons, films, fabrics and the like having a reduced, subdued or modified lustre which have a basis of an organic derivative of cellulose and contain a finely divided substantially white organic compound which has a melting point of at least about 200° C. and is an acidyl derivative of a diamino diphenyl base.

6. Artificial spun products of cellulose acetate having a subdued lustre due to the presence therein of fine particles of a diacidyl derivative of a diamino-diphenyl base.

7. Artificial spun products of cellulose acetate having a subdued lustre due to the presence therein of fine particles of diacetyl benzidine.

8. Artificial spun products of cellulose acetate having a subdued lustre due to the presence therein of fine particles of dibenzoyl benzidine.

9. Artificial filaments, threads, yarns, ribbons, films, fabrics and the like having a reduced, subdued or modified lustre which have a basis of cellulose acetate and contain finely divided diacetyl tolidine.

10. A spinning solution for use in the manufacture of artificial spun products, which comprises an organic derivative of cellulose dissolved in an organic solvent medium, and contains fine particles of a substantially white crystalline organic compound which is substantially insoluble in the organic derivative of cellulose and in aqueous liquids, and has a melting point of at least 207° C.

11. A spinning solution for use in the manufacture of artificial spun products which comprises cellulose acetate dissolved in an organic solvent medium and contains fine particles of a substantially white crystalline organic compound which is substantially insoluble in the cellulose acetate and in aqueous liquids, and has a melting point of at least 207° C.

12. A spinning solution for use in the manufacture of artificial spun products, which comprises cellulose acetate dissolved in an organic solvent medium and contains fine particles of a substantially white crystalline organic compound which is substantially insoluble in the cellulose acetate, in aqueous liquids and in common organic solvents, and has a melting point of at least 240° C.

13. A spinning solution for use in the manufacture of artificial spun products which comprises an organic derivative of cellulose dissolved in an organic solvent medium and which contains fine particles of a substantially white crystalline organic compound which contains the diphenyl group, is substantially insoluble in the organic derivative of cellulose and in aqueous liquids and which has a melting point of at least 207° C.

14. A spinning solution for use in the manufacture of artificial spun products, which comprises cellulose acetate dissolved in an organic solvent medium and contains fine particles of a diacidyl derivative of a diamino diphenyl base.

15. A spinning solution for use in the manufacture of artificial spun products, which comprises cellulose acetate dissolved in an organic solvent medium and contains fine particles of diacetyl benzidine.

16. A spinning solution for use in the manufacture of artificial spun products, which comprises cellulose acetate dissolved in an organic solvent medium and contains fine particles of dibenzoyl benzidine.

HENRY DREYFUS.

CERTIFICATE OF CORRECTION.

Patent No. 2,039,302. May 5, 1936.

HENRY DREYFUS.

It is hereby certified that error appears in the printed specification of the above numbered patent requiring correction as follows: Page 3, first column, line 40, claim 3, before the word "substance" insert organic; and that the said Letters Patent should be read with this correction therein that the same may conform to the record of the case in the Patent Office.

Signed and sealed this 2nd day of June, A. D. 1936.

(Seal)

Leslie Frazer
Acting Commissioner of Patents.